Oct. 30, 1928.  
M. H. KERN  
1,690,019  
AUTOMOBILE LAMP  
Filed April 18, 1927   2 Sheets-Sheet 2

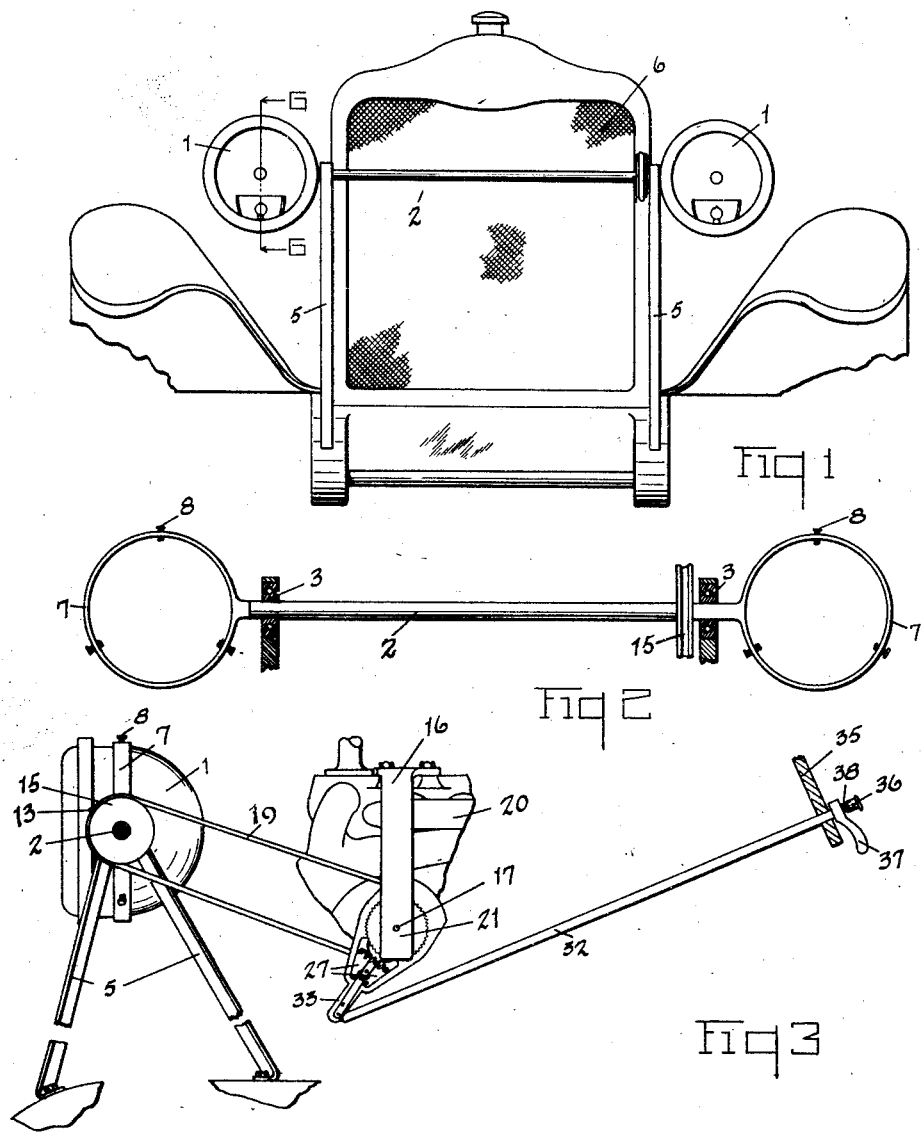

Mason H. Kern, Inventor
By Faust F. Crampton, Attorney

Patented Oct. 30, 1928.

1,690,019

UNITED STATES PATENT OFFICE.

MASON H. KERN, OF TOLEDO, OHIO.

AUTOMOBILE LAMP.

Application filed April 18, 1927. Serial No. 184,797.

My invention has for its object to provide an efficient means for controlling the rays of light of automobile lamps so as to prevent the intensive blinding glare in the eyes of the operator of an approaching automobile and yet which is so constructed as to produce an intensely lighted area in advance of the automobile. The invention particularly provides means for limiting the rays of light well below the plane of the eyes of the operator of an approaching automobile.

As is well known in the art, visors have been heretofore provided for eliminating the glare but, owing to the light being reflected from the lower part of the reflector of the lamp and, particularly, owing to the diffusion of the light the objectionable glare is nevertheless produced. By my invention, the lamp may be turned downward so that the axis of the lamp will be directed towards the road and an electric bulb is lighted for directing the rays forward and beneath the edge of the lamp and so as to intensely light an extended area in front of the vehicle. The bulb that is thus lighted when the lamp is turned down is so positioned with reference to the lens that the light will strike the inner surface of the lens below the critical angle and consequently all of the rays of light that strike the surface of the lens will be reflected forward to a point in advance of the automobile. The lens of the lamp, moreover, is so constructed that the rays of light will be spread laterally when the lamp is turned down and yet will not spread the rays materially when the lamp is in its normal position and the light is produced by a central bulb. Thus, by my invention the rays of light will, when desired, be confined within the limits of a substantially horizontal plane and which may thus be completely controlled with reference to their angle to the horizontal.

The invention also provides means for manipulating the lamp so that the road may be lighted with the rays of light that are projected well in front of the automobile or for confining the rays of light to within a definite plane having the desired angle with respect to the road. The invention also involves other features and advantages that will appear in the following description and upon examination of the drawings.

The invention may be contained in structures of different forms and, to illustrate a practical application of the invention, I have selected a construction containing the invention as an example of such structures and shall describe it hereinafter. The particular construction selected is shown in the accompanying drawings.

Figure 4:
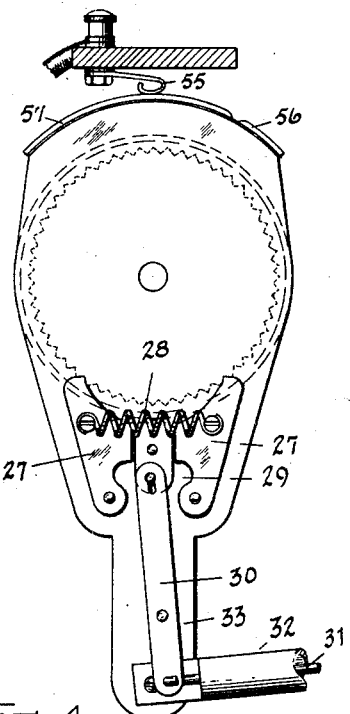
Figure 5:
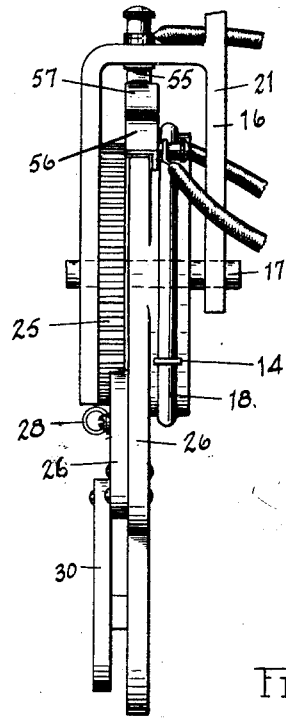
Figure 6:
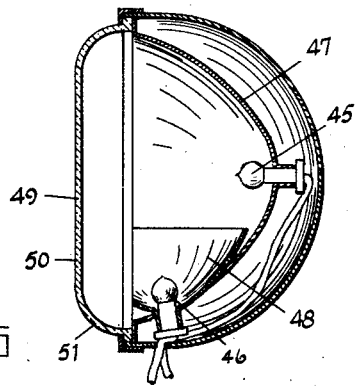
Figure 8:
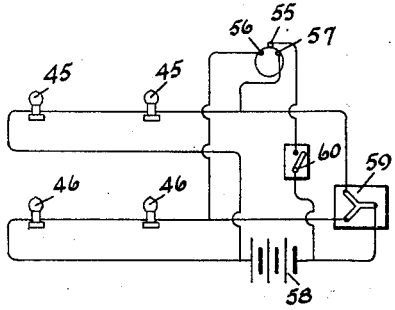
Figure 7:
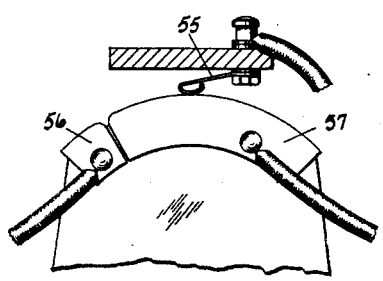

Fig. 1 is a front view of an automobile on which the lamps and their controlling mechanism embodying my invention are mounted. Fig. 2 illustrates a shaft for supporting the lamps. Fig. 3 illustrates a side view of a switch and an actuating means. Fig. 4 illustrates a side view of a clutch lock. Fig. 5 is an edge view of the device illustrated in Fig. 4. Fig. 6 illustrates a section of one of the lamps shown in Figs. 1 and 3. Fig. 7 illustrates more in detail the switch that is shown in Fig. 4. Fig. 8 is a diagram of the connections of the electric bulbs with the source of current.

In the particular form of construction shown in the drawings the lamps 1 are supported on a shaft 2 that is rotatably mounted in ball bearings 3 that are supported in the upper ends of suitable brackets 5. The brackets 5 are connected to any part of the automobile and so as to locate the lamps 1 well up towards the top of the radiator 6. The brackets 5 may be supported on the side bars of the chassis of the automobile.

The lamps 1 may be connected to the bar 2 by any suitable means. In the particular form of construction shown, the lamps are secured in rings 7 which are connected to or formed integral, as by welding, with the bar 2. The lamps may be secured in the rings 7 by means of the screws 8. They are thus rotatably supported so that their axes of rotation will lie substantially in the plane of the focal axes of the lamps.

The lamps may be rotated by any suitably manually operated means which extend preferably to a position where the operator of the car may readily manipulate the lamps so as to control the area, and more particularly, so as to confine the rays of light below a desired plane. The shaft 2 is provided with a pulley wheel 15 and a bracket 16 is provided with a shaft 17 on which a pulley wheel 18 is located. The pulley wheels 15 and 18 are connected together by means of a suitable belt 19 so that upon rotation of the shaft 17 the pulley 15 will be rotated, which will, in turn, rotate the lamps through the desired angle. Preferably the belt 19 is connected to the pulley wheels 15 and 18 at 13 and 14 in order to prevent slipping of the belt 19 relative to the pulley wheels 15 and 18 and so as to insure movement of one pulley wheel upon movement of the other. The brackets 16 may be connected to any suitable fixed part of the automobile. In the form of construction the bracket 16 is made in the form of an L, one end being secured to the top of the engine 20 while in the lower end, the shaft 17 is rotatably supported. Preferably, the lower end of the bracket 16 is made in the form of a Y, 21, and the pulley wheel 18 is supported between the arms of the Y. A ratchet 25 is secured to one of the arms of the Y and a plate 26 is connected to the pulley 18. A pair of dogs are pivotally mounted on one side of the plate 26 and so as to engage the ratchet 25. The dogs 27 are drawn towards each other by means of a spring 28 and so as to normally engage the ratchet 25 at two points. A release member 29 is located between the dogs 27 and pivotally supported on the plate 26 and so that when turned the ends of the release member will engage and move the dogs from engagement with the ratchet, and, consequently, the plate 26 and the pulley wheel 18 may be rotated about the shaft 17 in either direction. When, therefore, the release member 29 is located in its normal position between the dogs 27, the spring 28 will operate to cause the dogs 27 to so engage the ratchet 25 that the plate 26 will be held locked in the position to which it may be turned.

The release member 29 may be rotated in either direction to cause releasement of the ratchet from the dogs. The release member is operated by a lever 30 that is also pivotally connected to the plate 26. The lever 30 may be operated by a suitable rod or stiff wire 31 and the plate 26 may be operated by means of a tube 32 which is connected to the lower end of the plate. The plate 26 may be provided with an arm 33 to which the tube 32 may be connected. Thus the pulley wheel 18 may be operated and the lamps may be controlled by the manipulation of the wire 31 and the tube 32. The wire 31 and the tube 32 extends to the instrument board 35 and handles 36 and 37 are connected to the ends of the wire 31 and the tube 32 whereby the plate 33 and the release member 29 may be easily manipulated. Preferably, a spring 38 is located intermediate the handles 36 and 37 so as to yieldingly retain these parts in a substantially definite relation. When, therefore, the plate 26 is to be moved angularly the handle 36 is first depressed or drawn, preferably, the former, to operate the release member and then the plate is moved by the movement of the handle 37. The handle 36 will then be moved with the handle 37, and the handles 36 and 37 will maintain their definite relationship notwithstanding the position to which the plate 26 may be moved. Upon movement of the handles 36 and 37 the lamps 1 will be swung about the axis of the shaft 2 and so as to elevate or lower their focal axes.

The lamps are provided with two electric bulbs 45 and 46 which are located in the axes of substantially parabolic reflectors 47 and 48. The reflectors are so located relative to each other that their axes are located in vertical planes and are, moreover, substantially at right angles to each other. The lamp 45 is located substantially in the axis of the lamp while the lamp 46 is located at a point in the lower part of the reflector 47. The reflector 48 operates to reflect the light towards the opposite edge of the reflector 47. The front of the lamp is provided with a lens 49. The axis of the lens 49 is coincident with the axis of the reflector 47 while the axis of the reflector 48 is directed towards the front edge portion of the lens 49 when the lamp is turned down. The lens 49 is, preferably, plane in its central portion as at 50 and is provided with a rounded edge portion as at 51 and is so located with reference to the reflector that the rays of light from the bulb 45 will pass directly through the lens while the rays of light from the bulb 46 will pass towards the curved edge portion of the lens and also so that the rays of light from the bulb 46 that strike the plane portion 50 of the lens 49 that will all be reflected towards the curved portion of the lens since substantially all of the rays of light from the lamp 46 will strike the surface of the plane portion of the lens 49 at an angle less than the critical angle and hence substantially all of such rays will be reflected towards the curved edge portion of the lens. Consequently, substantially all of the rays of light from the lamp 46 will pass directly through the curved edge portion of the lens. The rays of light will be, by reason of the curvature of the glass and the diffusion from the reflector, distributed laterally as well as forwardly. Also, when the lamp is in its normal position the rays from the central lamp 45 will be directed forward while some of the rays will strike the sides of the reflector 48 which will reflect the rays upwardly and laterally.

By my invention the circuit is switched from one bulb 45 of each lamp to the other bulb 46 when the lamps are rotated on the axis of the shaft 2. This is accomplished by means of the contact 55 which is supported on and electrically insulated from the bracket 16 and the contacts 56 and 57 that are mounted on and insulated from the plate 26. The contact 57 is connected to the bulbs 45 while the contact 56 is connected to the bulbs 46. The lamps are connected to the battery 58 and a suitable switch 59 may be connected in the circuit for connecting the lamps with the battery independent of the lamp tilting mechanism. Also a switch 60 may be connected in the circuit of the contact 55. Thus when the lamps are tilted by the operation of the plate 26 the contacts 56 and 57 will be moved relative to the contact 55 and when the lamps are moved beyond a certain point in their rotation about the axis of the shaft 2, the connection of the contact 55 will change from the contact 57 to the contact 56 and consequently one or the other sets of bulbs 45 and 46, will become lighted. Thus when the edges of the lamps are located substantially in horizontal planes, the rays of light produced by the bulbs 46 will all be located below the planes of the edges and all glare will be entirely eliminated and when the bulbs 45 are connected in circuit, the light will be projected a long distance in advance of the automobile.

I claim:

1. A lamp for vehicles and the like, an arm, connecting means between the lamp and the arm, a locking mechanism connected to the arm for locking the arm in any position to which it may be turned, a tube connected to the arm and extending to near the driver's seat, and a rod located in the tube connected to the locking means and extending to near the driver's seat, whereby the lamp may be adjustably located in position.

2. A lamp for vehicles and the like, an arm for rotating the lamp, a ratchet fixedly secured to a part of the automobile, a dog connected to the arm for adjustably securing the arm in position relative to the ratchet, a release member for moving the dog from the ratchet, a pair of members, one connected to the release member and the other connected to the arm and extending to the point near the driver's seat for operating the release member and the arm.

3. A lamp for vehicles and the like, an arm, connecting means between the lamp and the arm, a locking means connected to the arm for locking the arm in any position to which it may be turned, a member connected to the arm and extending to near the driver's seat, and a member connected to the locking means and extending to near the driver's seat adjustably locating the lamps in position, a pair of electric contacts mechanically connected to the arm and moved therewith, a fixed contact adapted to make contact with the first named contacts, the bulbs of the lamp connected to the first named contacts and the source of current connected to the fixed contact and the lamp whereby the circuits of the bulbs are opened and closed when the lamp is rotated by the arm.

4. In an automobile lighting means, a shaft rotatably supported in front of the radiator of the automobile, lamps supported on the shaft, a second shaft, means for supporting the second named shaft within the hood of the automobile, means interconnecting the shafts for rotating the first named shaft upon rotation of the second named shaft, a ratchet and a dog mechanism, one connected to the second named shaft and the other connected to the support of the second named shaft, means for disengaging the ratchet and the dog and means for rotating the arm to rotate the lamps upon disengagement of the dog and the ratchet.

In witness whereof I have hereunto signed my name to this specification.

MASON H. KERN.